United States Patent [11] 3,609,102

| [72] | Inventor | Mitchell L. Schlossman |
| | | Rockaway, N.J. |
| [21] | Appl. No. | 863,356 |
| [22] | Filed | Oct. 2, 1969 |
| [45] | Patented | Sept. 28, 1971 |
| [73] | Assignee | Paris Cosmetics, Inc. |

[54] MULTICOLORED TRANSPARENT POLYMER GEL EMOLLIENT BASES, WITH OIL-MISCIBLE DYES, FOR OIL-SOLUBLE COSMETICS, PERFUME AND PHARMACEUTICALS
7 Claims, No Drawings

[52] U.S. Cl. ..................................... 252/522,
8/14, 8/76, 8/79, 106/171, 106/191, 106/193,
106/204, 106/248, 106/251, 106/253, 106/266,
252/1, 252/316, 252/408, 260/29.6, 260/41,
424/7, 424/59, 424/63, 424/71, 424/78, 424/81,
424/168, 424/172, 424/173, 424/343, 424/347,
424/358
[51] Int. Cl. ....................................... G01n31/22,
A61k 7/00, C11b 9/00
[50] Field of Search ............................ 424/7, 59,
63, 71, 78, 81, 168, 172, 173, 343, 347, 358;
252/1, 316, 408, 522; 8/14, 76, 79; 260/29.6, 41;
106/171, 191, 193, 204, 248, 251, 253, 266

[56] References Cited
UNITED STATES PATENTS

| 3,011,950 | 12/1961 | Mehaffey | 424/59 X |
| 3,101,301 | 8/1963 | Siegal et al. | 424/71 X |
| 3,133,865 | 5/1964 | Richardson et al. | 424/71 |
| 3,215,603 | 11/1965 | Gross et al. | 424/71 X |
| 3,330,731 | 7/1967 | Mehaffey | 424/81 X |
| 3,395,215 | 7/1968 | Schubert | 424/81 X |
| 3,427,382 | 2/1969 | Haefele | 424/71 |
| 3,485,915 | 12/1969 | Gerstein et al. | 424/81 |

*Primary Examiner*—Shep K. Rose
*Attorneys*—Harry C. Bierman, Jordan B. Bierman and Bierman & Bierman

ABSTRACT: The composition comprises a first polar phase and a second nonpolar phase. The second phase is comprised of a plurality of discrete macroscopic bodies dispersed throughout the first phase. The first phase comprises a polar solvent having a polymer dissolved therein. The polymer imparts a Bingham yield value to the composition which is sufficient to retain the second phase in dispersion. The bodies impart to the composition an optical effect which can be enhanced by incorporating into said bodies differing colors.

MULTICOLORED TRANSPARENT POLYMER GEL EMOLLIENT BASES, WITH OIL-MISCIBLE DYES, FOR OIL-SOLUBLE COSMETICS, PERFUME AND PHARMACEUTICALS

The present invention relates to gels. More particularly it relates to transparent gels containing dispersed therethrough discrete particles of lypophilic material and to a method of manufacturing these gels. These particles impart a characteristic optical effect. The gels are emollient and are useful as cosmetic and pharmaceutical bases.

Cosmetic and pharmaceutical emollient bases are generally emulsion based. They are typically oil-in-water or water-in-oil emulsion systems. Water-in-oil emulsion bases are usually greasy and are therefore unacceptable to many users. Oil-in-water emulsion bases are usually greasy and are therefore unacceptable to many users. Oil-in-water emulsion bases are disadvantageous in a number of respects. Materials present in the oil phase having some solubility in the aqueous external phase often migrate from the oil to the external phase. For example, perfume oils which have been incorporated into the oil phase may migrate to the aqueous phase. This results in a drop in fragrance intensity and loss of fragrance top notes. There is need for a new type of cosmetic and pharmaceutical emollient base. One which is esthetically pleasing, elegant, different and reflects a more dynamic image. The present invention seeks to provide such a base. The base of the present invention is a semisolid product. More specifically it is a gel. The gel comprises a clear semisolid phase having dispersed therethrough discrete macroscopic globular oil-soluble nonpolar emollient bodies. These bodies, owing to the high viscosity of the gel, remain suspended. They impart a characteristic optical effect to the gel. The optical effect can be enhanced by making the bodies multicolored.

The base of the present invention opens the door to a number of novel formulating techniques. Ingredients which are incompatible can be separated and used in the same base. One ingredient is dissolved or suspended in a first oil-soluble nonpolar material. The other ingredient is dissolved or suspended in a second oil-soluble nonpolar material. The first and second materials are separately dispersed throughout the gel in the form of discrete macroscopic globular bodies.

This approach can also be utilized for dispersing bodies which differ in color. As a further refinement of this technique a gel containing different colored bodies (for example, blue and yellow) would upon being rubbed onto the skin change to a completely different color (green).

The dispersed bodies when colored are highly visible showing intense color. The color level can be adjusted so that when the base is applied to the skin the color seems to vanish.

The base of the instant invention offers another significant advantage. Perfumes can be incorporated in the globular bodies. Since these dispersed bodies are macroscopic in size less surface area is exposed to the exterior phase as compared to oil-in-water emulsion bases. Thus, when perfume oil is incorporated into the bodies, perfume loss is substantially reduced. Yet when the gel is rubbed upon the skin the full strength of the perfume, within the dispersed bodies, is made available. The continuous phase of the gel of the present invention is comprised of a polymer dissolved in a polar solution.

A sufficient amount of polymer is employed to impart to the resultant gel a Bingham yield value. Any polymer can be used which will form a solution having a consistency (yield point) effective to retain the oil-soluble bodies in suspension. In general, the maximum concentration of the polymer should produce a semisolid to solid mass which is not pourable. Suitable polymer materials include for example a water-soluble resin containing carboxylic salt groups, said resin being a copolymer of acrylic acid and polyallyl sucrose, an acidic copolymer of ethylene and maleic anhydride, cellulose, hydroxyethyl cellulose and hydroxypropyl cellulose. A preferred polymer is the above-described copolymer of acrylic acid and polyallyl sucrose. When the acid carboxylic groups of this resin are neutralized with a base the resin forms viscous solutions or gels.

Also preferred is the above-described copolymer of ethylene and maleic anhydride. A wide variety of bases can be used to neutralize the carboxylic acid groups of said acid resins, as for example, ammonium hydroxide, alkanolamines such as triethanolamine and alkali metal bases. Amines such as triethylamine and the like may also be employed. The continuous phase, in which the polymer is dispersed, is preferably water or a mixture of water and other solvents, as for example, aliphatic alcohols such as glycerin and propylene glycols and lower aliphatic water miscible alcohols such as ethanol and isopropanol.

The composition of the gel should be such that its materials do not solubilize or emulsify the oil-soluble materials when they are dispersed therein. The use of surface-active agents should be restricted, and preferably avoided. Further, the use of solvents which can solubilize and/or emulsify and opacify the gel when used in conjunction with the specific oil-soluble material employed should be avoided.

Optionally, an ultraviolet absorber, as for example a hydroxybenzophenone may be incorporated in the gel composition of the present invention. The ultraviolet absorber inhibits the adverse effects of sunlight on the product and insures a more stable suspension upon aging.

The amount of ultraviolet absorber employed in the composition may be varied, however it should be less that 1 percent by weight.

The chemical composition of each of the materials comprising the oil-soluble nonpolar dispersed bodies should be such that said materials are insoluble and nonemulsifiable in water. The materials should have a semisolid consistency at room temperature. Petroleum jelly is preferred. It is an ideal material for the gel composition of the present invention since is is insoluble in water, glycerin, propylene glycol and alcohol.

Nonpolar, water-insoluble materials such as water-insoluble lanolin derivatives, cocoa butter, cetyl alcohol, cetyl lactate, isopropyl lanolate, isopropyl palmitate or combinations thereof may alternatively be employed either as a replacement for the petroleum jelly or in combination therewith. One or more of the following oil-soluble materials can be optionally dissolved in the above-mentioned nonpolar water-insoluble materials; oil-miscible dyes, perfume oil, slip-improving agents, mineral oils, lanolin derivatives, silicones and polyglycols. Sunscreen agents, menthol, aromatic oils and oil-soluble antibacterial agents such as hexachlorophene may also be added thereto.

The characteristic appearance of the gel composition is affected by a number of factors. For example, the composition of the gel, the composition of the oil-soluble bodies, the respective melting point ranges of the oil-soluble bodies, the rate of addition of the oil phase to the aqueous or alcoholic gel phase, the temperature differential between the oil phase and the aqueous or alcoholic gel phase upon their admixing, and the rate of mixing of the oil and gel phases. These factors can be properly selected and integrated so as to insure the preparation of a gel having a desired optical effect.

The following examples are provided for the purpose of illustrating the gel compositions of the present invention and not for the purpose of limiting same. In these examples unless otherwise indicated percent means percent by weight.

The above gel composition is prepared as follows:

The ingredients of part I are weighed into a suitable vessel and mixed thoroughly.

The aqueous triethanolamine solution of part II is added to this mixture thereby neutralizing the carboxyvinyl polymer and forming a gel having a ph of about 7.5.

The petroleum jelly of part III (or any of the previously mentioned oil-soluble semisolids) is heated to about 10° C. above its melting range (which in the case of petroleum jelly is 48°–64 C).

The oil-miscible colors, sesame oil, isopropyl palmitate, isopropyl lanolate and perfume oil are then dissolved into the heated petroleum jelly.

The petroleum jelly phases are maintained at 10° C. above their melting range and added dropwise to the gel formed by combining parts I and II. The temperature of the petroleum jelly phase (oil phase) at the time of its addition to the gel phase is critical. It must be high enough so that when the hot petroleum jelly phase contacts the colder gel phase the resultant temperature drop of the petroleum jelly phase will not be so rapid as to immediately precipitate the oil-soluble material out of the petroleum jelly phase melt. During this dropwise addition the gel is subjected to continuous slow mixing.

The size of the added drops and the rate of addition determine the discretion and the final particle size of the resultant suspended water-insoluble bodies.

The above-described gel composition is stable, when subjected to prolonged storage at 45° C. and additionally to freeze-thaw storage conditions.

Example 2

| Phase | Ingredient | % |
|---|---|---|
| Phase A | Propylene glycol | 15.00% |
| | 2 Hydroxy 4 methoxy benzophenone 5-sulfonic acid | 0.10% |
| | Deionized Water | 50.75% |
| | Methyl paraben | 0.15% |
| | Propyl paraben | 0.05% |
| | Carboxy vinyl polymer | 0.60% |
| Phase B | Deionized Water | 5.00% |
| | Triethanolamine | 1.20% |
| Phase C | Oil-soluble blue dye | 0.01% |
| | Petroleum jelly | 0.40% |
| Phase D | Oil-soluble green dye | 0.01% |
| | Petroleum jelly | 0.40% |
| Phase E | Oil-soluble red dye | 0.01% |
| | Petroleum jelly | 0.40% |
| Phase F | Oil-soluble yellow dye | 0.01% |
| | Petroleum Jelly | 0.40% |
| Phase G | Oil-soluble orange dye | 0.01% |
| | Petroleum jelly | 0.40% |
| Phase H | Perfume | 0.10% |
| | Ethyl alcohol | 25.00% |
| | | 100.00% |

The procedure for preparing the above-described gel composition is essentially as described in example 1 with the exception that completed phases A through G are mixed into the alcohol-perfume mixture phase H.

It is interesting to note that when oil-soluble dyes are employed said dyes being very slightly soluble in ethanol it is found that contrary to expectation said dyes do not bleed into the alcohol when suspended in the instant gel composition.

The clarity of this alcoholic gel can be substantially improved by using a lesser amount of petrolatum thereby obtaining fewer oil-colored particles.

The gel composition of the present example is found to be stable when subjected to prolonged storage at 45° C. and additionally to freeze-thaw storage conditions.

I claim:

1. A freeze-thaw stable transparent gel composition, useful as an emollient base for cosmetics, perfume, and pharmaceuticals, said transparent gel having an optical multicolored effect and consisting essentially of a clear continuous aqueous or aqueous-lower aliphatic water-miscible alcoholic first polar solvent phase, a second nonpolar oil phase, said second oil phase being comprised of a plurality of differently colored discrete macroscopic globular, oil-soluble, first polar phase insoluble emollient bodies dispersed throughout said first phase, said first phase comprising a polar solvent and a polymer dissolved therein, said polymer imparting high viscosity to said composition with a Bingham yield value sufficient to retain said second phase in semisolid to solid mass dispersion, which is not pourable, said plurality of differently colored discrete macroscopic globular oil-soluble, first polar phase insoluble bodies having oil-miscible dyes dissolved therein, imparting to said composition said optical multicolored effect, and being adapted for further dissolving therein oil-soluble cosmetics, perfumes, and pharmaceuticals, said composition being free of surface-active agents and solvents which can solubilize or emulsify and opacity the oil-soluble materials or the gel, wherein said polymer is methyl cellulose, hydroxyethyl cellulose, hydroxypropyl cellulose, a neutralized salt of an acidic copolymer of acrylic acid and polyallyl sucrose, or a neutralized salt of an acidic copolymer of ethylene and maleic anhydride, and wherein said oil phase material is selected from the group consisting of petroleum jelly, cocoa butter, water-insoluble lanolin derivatives, and mixtures thereof.

2. A composition as described in claim 1 wherein said neutralized salt is prepared by neutralizing free carboxylic acid groups of said acidic copolymers with ammonium hydroxide, an alkanolamine, an alkali metal base or an amine.

3. A composition as described in claim 1 wherein said polar solvent is water, a water miscible lower aliphatic alcohol, or a mixture thereof.

4. A composition as described in claim 3 wherein said water-miscible aliphatic alcohol is glycerin, propylene glycol, ethanol, isopropanol or a mixture thereof.

5. A composition as described in claim 1 wherein oil-soluble cosmetic, perfume and pharmaceutical ingredients, which are incompatible, can be separated, with different colors, and used in the same base and wherein a first oil-miscible dye thereby rendering said portion one color, and another portion of said bodies have incorporated therein a first incompatible oil-soluble ingredient and a second oil-miscible dye thereby rendering said another portion a second color, said first and said second colors differing from each other, whereby said multicolored optical effect is enhanced and incompatible oil-soluble ingredients can be separated, with different colors, and used in the same base.

6. A composition as described in claim 5 wherein said first color and said second color are such that upon topical application of said composition with friction to a skin or other body surface a completely different third color results.

7. A composition as described in claim 1 further including a perfume, said perfume being dissolved within said bodies thereby substantially extending perfume life.